(12) United States Patent
Neeli (10) Patent No.: US 12,212,497 B2
(45) Date of Patent: Jan. 28, 2025

(54) EMBEDDING AN ARTIFICIALLY INTELLIGENT NEURON CAPABLE OF PACKET INSPECTION AND SYSTEM OPTIMIZATION IN IPV6 ENABLED WLAN NETWORKS

(71) Applicant: Fortinet, Inc., Sunnyvale, CA (US)

(72) Inventor: Srinivasa Subbarao Neeli, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 409 days.

(21) Appl. No.: 17/566,838

(22) Filed: Dec. 31, 2021

(65) Prior Publication Data

US 2023/0216796 A1 Jul. 6, 2023

(51) Int. Cl.
*H04L 47/127* (2022.01)
*G06N 20/00* (2019.01)
*H04L 45/74* (2022.01)
*H04W 84/12* (2009.01)

(52) U.S. Cl.
CPC ......... *H04L 47/127* (2013.01); *G06N 20/00* (2019.01); *H04L 45/74* (2013.01); *H04W 84/12* (2013.01)

(58) Field of Classification Search
CPC ....... H04L 47/127; H04L 45/74; G06N 20/00; H04W 84/12
See application file for complete search history.

(56) References Cited

U.S. PATENT DOCUMENTS

2023/0115046 A1* 4/2023 Karta .................. H04L 63/1483
726/23

FOREIGN PATENT DOCUMENTS

AU          2015201889 B2 *  4/2016 ........... G05B 13/048

* cited by examiner

*Primary Examiner* — Chi H Pham
*Assistant Examiner* — Samuel Dilan Rutnam
(74) *Attorney, Agent, or Firm* — Law Office of Dorian Cartwright; Dorian Cartwright (57) ABSTRACT

Responsive to matching a site prefix to IPv6 network traffic from clients, the traffic as intended, and responsive to not matching the site prefix, classifying the corresponding traffic as unintended. An initial rate of packet occurrence and predict load caused by intended traffic and predicting load caused by unintended traffic is calculated, based on an initial rate of packet occurrence. The predicted traffic loads are fed back by configuring behavior of network modules according to the predictions of intended traffic load and unintended traffic load. Packet processing traffic at the network modules is based on traffic classification from the outcome of the AI-neuron.

20 Claims, 6 Drawing Sheets

EMBEDDING AN ARTIFICIALLY INTELLIGENT NEURON CAPABLE OF PACKET INSPECTION AND SYSTEM OPTIMIZATION IN IPV6 ENABLED WLAN NETWORKS

FIELD OF THE INVENTION

The invention relates generally to computer networking, and more specifically, to intelligently filter and optimize processing for unwanted IPv6 traffic from Wi-Fi clients.

BACKGROUND

Current era IPv6 devices default to support IPv6. To overcome the pit falls in IPv4 limited addressing space, IPv6 brought up a tremendous change by expanding the availability of addressing space using Hexadecimal notations. IPv6 address is 128 bits of length. adding Source and destination addresses to the header, size of IPv6 header is 40 odd bytes. Also, IPv6 by protocol is a multicast protocol-based implementation. Starting from discovery to end data passage, IPv6 depends on multicast protocol. With the multicast protocol base, IPv6 capable devices uses SLAAC (Stateless Address Auto Configuration) method to assign IPv6 address to their interface. As a result, IPv6 capable devices can auto configure their own IPv6 Address themselves without any need of DHCP Server in the network.

Problematically, IPv6 clients do not always obey network protocol with IPv6 addresses. Furthermore, the multicast nature of IPv6 can waste resources from unnecessary packet processing because some access points receive data packets unintendedly.

Therefore, what is needed is a robust technique for a system to intelligently filter and optimize processing for unwanted IPv6 traffic from Wi-Fi clients.

SUMMARY

These shortcomings are addressed by the present disclosure of methods, computer program products, and systems for intelligently filter and optimize processing for unwanted IPv6 traffic from Wi-Fi clients.

In one embodiment, IPv6 addresses for the plurality of Wi-Fi clients on a private network are learned. An attempt to match site prefix of IPv6 addresses to an assigned organizational specific address is made by an AI (artificial intelligence)-neuron. Responsive to matching the site prefix, classifying corresponding traffic as intended, and responsive to not matching the site prefix, classifying corresponding traffic as unintended, in an embodiment.

In another embodiment, initial rate of packet occurrence and predict load caused by intended traffic and predicting load caused by unintended traffic is calculated, based on an initial rate of packet occurrence. The predicted traffic loads are fed back by configuring behavior of network modules according to the predictions of intended traffic load and unintended traffic load. Packet processing traffic at the network modules is based on traffic classification from the outcome of the AI-neuron.

Advantageously, computer hardware performance is improved with enhanced malware security.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for intelligently filter and optimize processing for unwanted IPv6 traffic from Wi-Fi clients.

One of ordinary skill in the art will recognize many additional variations made possible by the succinct description of techniques below.

Figure 2:
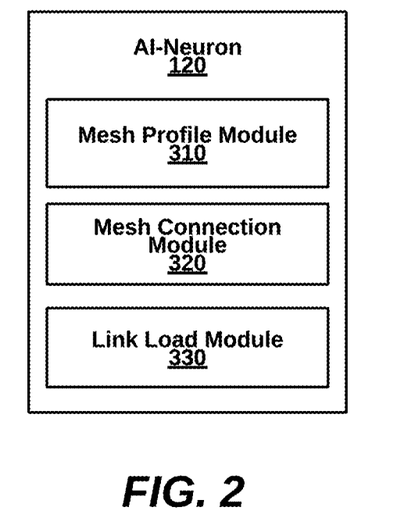
FIG. 2 is a more detailed block diagram illustrating an AI-neuron of the access point, according to an embodiment.
Figure 3:
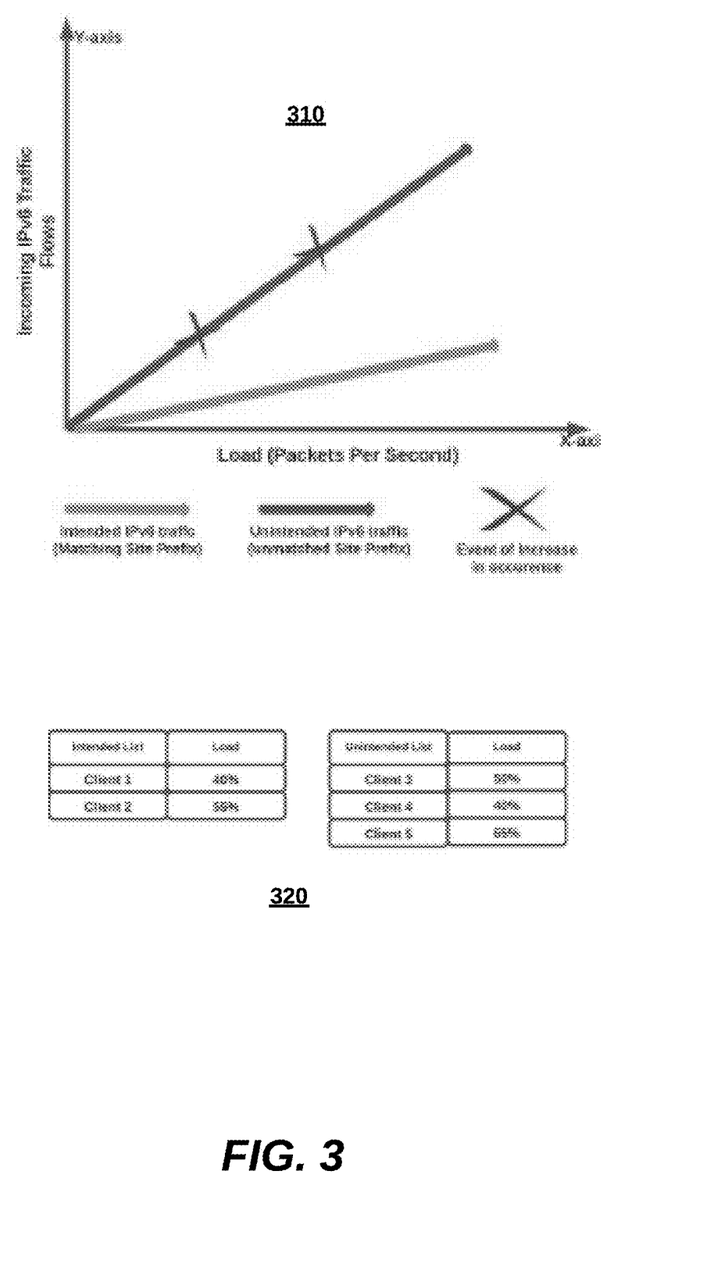
FIG. 3 is a chart and data table displaying the effect of unintended packets on load of the access point, according to an embodiment.

I. Systems for Intelligently Filtering Unwanted IPv6 Traffic (FIGS. 1-3)

Figure 1:
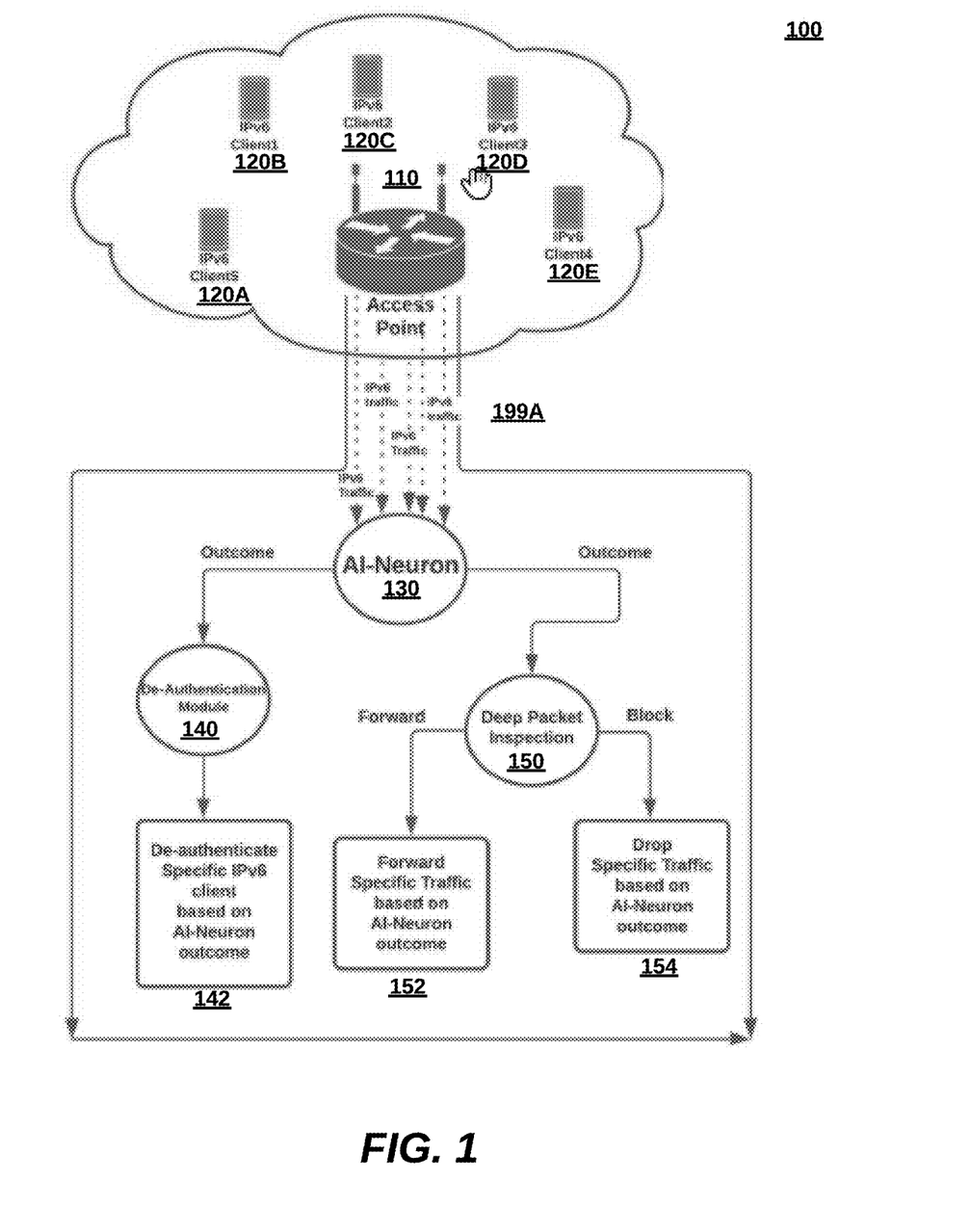
FIG. 1 is a high-level block diagram illustrating a system to intelligently filter and optimize processing for unwanted IPv6 traffic from Wi-Fi clients, according to an embodiment.

FIG. 1 is a high-level block diagram illustrating a system 100 to intelligently filter and optimize processing for unwanted IPv6 traffic from Wi-Fi clients, according to an embodiment. The system 100 includes an access point 110 and IPv6 clients 120A-E coupled to a data communication network 199. Many other configurations are possible, for example, with additional network components such routers, switches, repeaters, firewalls, and the like. Also, there can be many more or fewer clients in FIG. 1. The system components can be implemented in computer devices with non-transitory source code, such as set forth below with reference to FIG. 6.

The components of the system 100 are coupled in communication over the data communication network. Preferably, the access point 110 is connected to the data communication system via hard wire. The client 120A-E are preferably connected to the access point 110 via a wireless channel. The data communication network 199 can be any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11.

In one embodiment, the access point 110 further comprises an AI-neuron 120 to separate and optimizes for unwanted IPv6 traffic. After analyzing IPv6 addresses of data packets, each packet or packet session can be classified as intended or unintended. In one case, intended packets are forwarded for packet processing and unintended packets are dropped from packet processing. Further, a client source of unintended packets can be deauthenticated. FIG. 3 shows the effect of additional resource loads resulting from processing unwanted packets.

The AI-neuron 120, as referred to herein, comprises a piece of software code on non-transitory media which is capable of learning in deep and detail, with the data which was passed to it. Learning on the data sets which are inputted to the neuron, it is capable to project and predict the future outcome. The output prediction of the AI-neuron can be passed as an input to any networking module (pre-existing or newly added) in the network infrastructure, which helps in improving the performance and optimizing the present system. Thus, the AI-Neuron helps in future estimations based on the past, present and run time information. Further embodiments of the AI-neuron are described in more detail below with respect to FIG. 2.

In some embodiments, the access point 110 also acts as a traditional access point by serving clients in addition to SD-WAN operations. In more detail, the gateway access point 120 is configured with one or more SSIDs that uniquely identifies on networks. An SSID is broadcast in beacons to advertise the network connection to potential clients. A client responds to the beacon with a connection request that leads to the connection for exchanging data packets.

FIG. 2 is a more detailed illustration of the access point 110 of the system 100 of FIG. 1. The access point 110 includes a client learning module 210, a traffic classification module 220, and a load prediction module 230. The modules can be implemented in source code stored in non-transitory memory executed by a processor. Alternatively, the modules can be implemented in hardware with microcode. The modules can be singular or representative of functionality spread over multiple components. Many other variations are possible.

The client learning module 210 can learn IPv6 addresses for the plurality of Wi-Fi clients on a private network.

The traffic classification module 220 inspects traffic and attempts to match site prefix of IPv6 addresses to an assigned organizational specific address. Responsive to matching the site prefix, classifying corresponding traffic as intended, and responsive to not matching the site prefix, classifying corresponding traffic as unintended. Bits starting from 4 through 23 are specific to regional registry. By parsing these 20 bits one can identify the Region where the client is operating. (Ex: North America, South America, Asia, Africa etc.). Bits Starting from 24 through 32 specifies the Service provider prefix. Bits Starting from 33 through 48 Specifies the site prefix. This site prefix is specific to the organization/company and will be unique. By parsing the site prefix, it can be determined whether the particular IPv6 Device belongs to the specific organization or not. The site prefix plays a key role in any organization as IPv6 is an auto configurable address without any DHCP server help. Any IPv6 Capable Device need to obey and use the specific site prefix which is specific to the organization when getting served with that organization private network.

The load prediction module 230 calculates an initial rate of packet occurrence for predicting load [e.g., processor, network load, memory, network processes] caused by intended traffic and predicting load caused by unintended traffic, based on an initial rate of packet occurrence. A traffic load is fed back by configuring behavior of network modules of an access point according to intended traffic load and unintended traffic load. Traffic at the network modules is optimally processed based on traffic classification from the outcome of the AI-neuron.

II. Methods for Intelligently Filtering Unwanted IPv6 Traffic (FIGS. 4-5)

Figure 4:
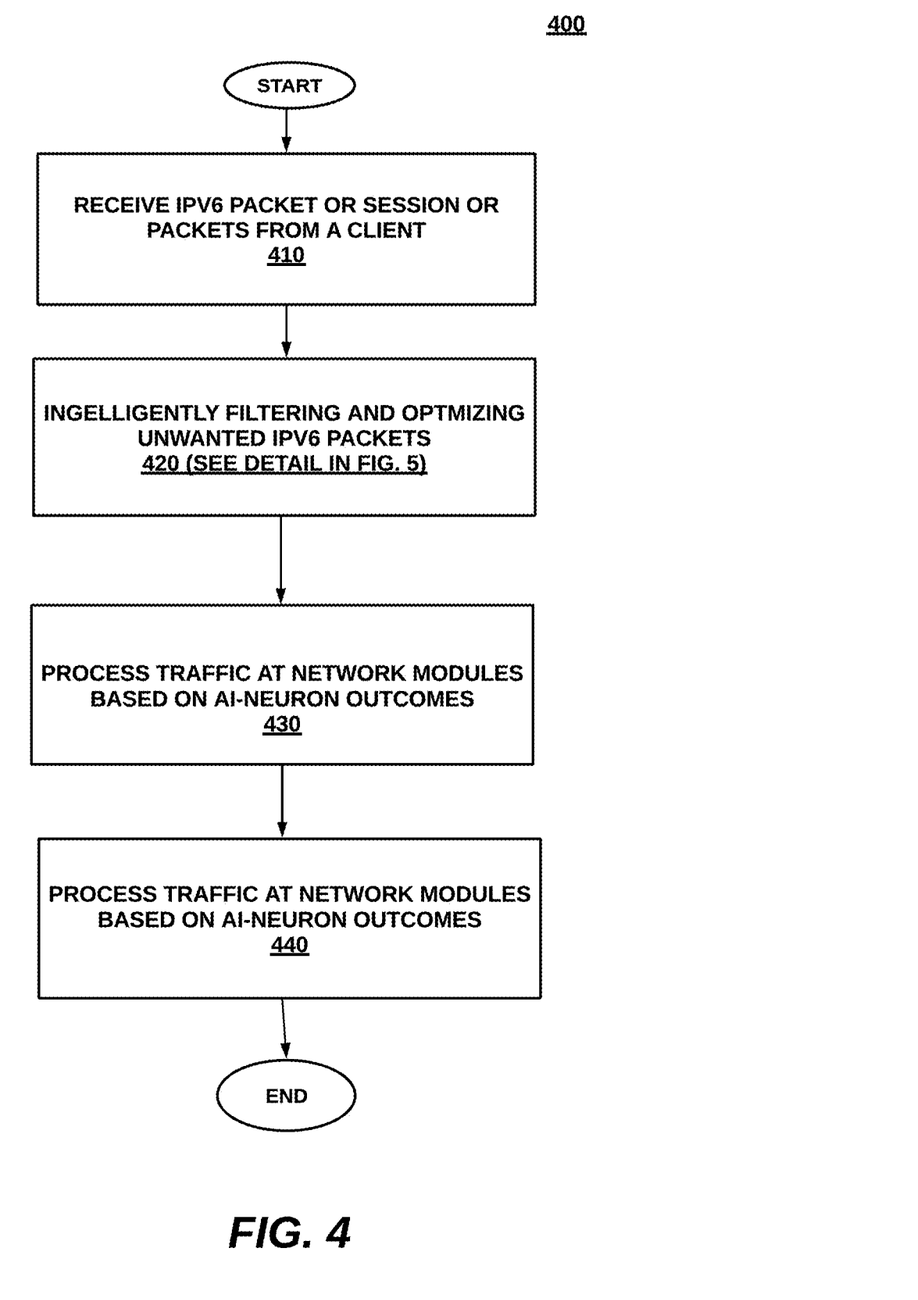
FIG. 4 is a high-level diagram illustrating a method of processing IPv6 packets, according to an embodiment.
Figure 5:
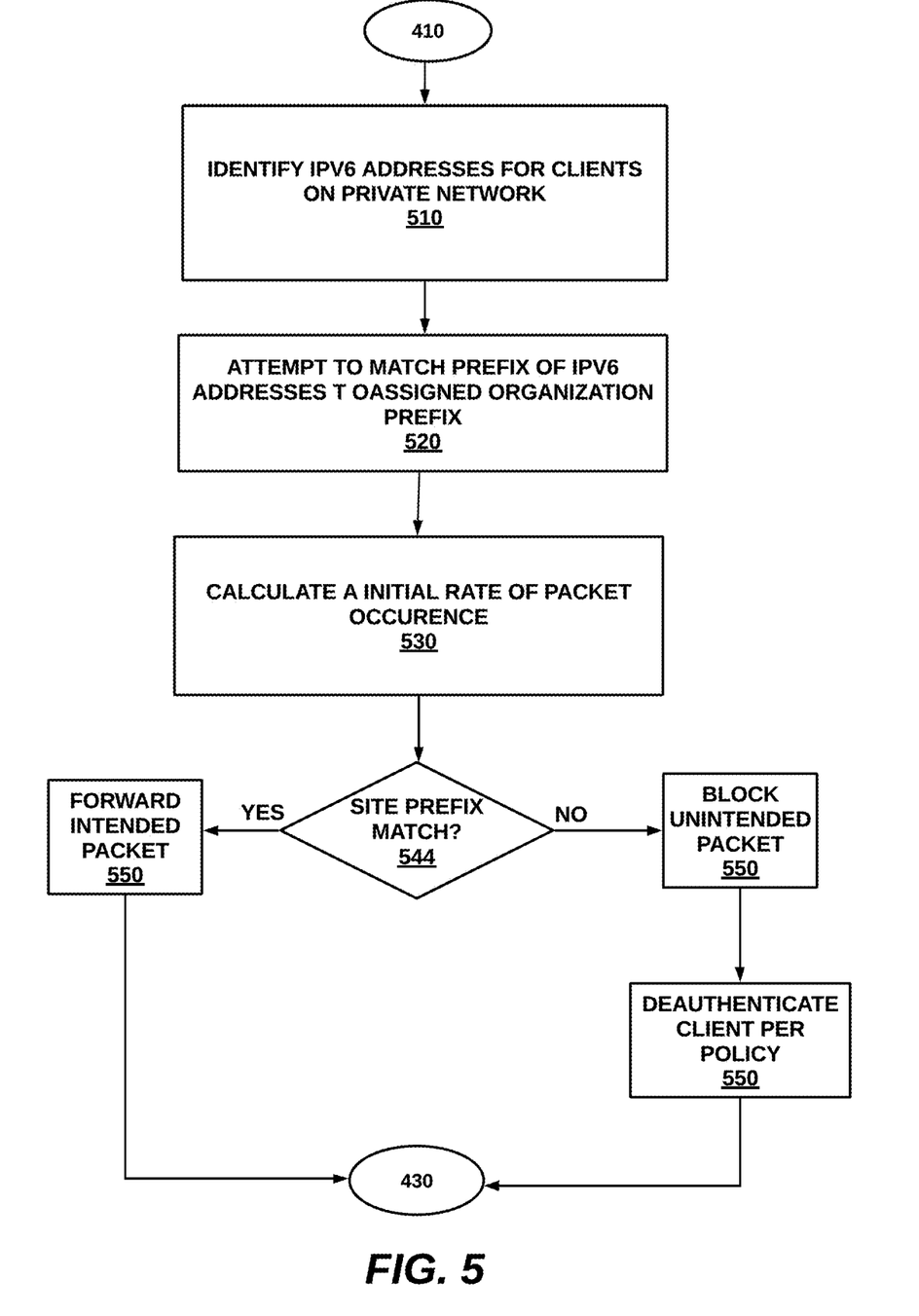
FIG. 5 is a more detailed flow diagram illustrating a step of intelligently filter and optimize processing for unwanted IPv6 traffic from Wi-Fi clients, from the method of FIG. 4, according to an embodiment.

FIG. 4 is a high-level flow diagram illustrating a method for processing IPv6 packets, according to one embodiment. The method 500 can be implemented, for example, by the system 100 of FIG. 1. The steps are merely representative groupings of functionality, as there can be more or fewer steps, and the steps can be performed in different orders. Many other variations of the method 500 are possible.

At step 410, a IPv6 packet or session of packets is received at an access point from a client.

At step 420, unwanted IPv6 traffic is intelligently filtered and optimized for processing for unwanted IPv6 traffic from Wi-Fi clients, as described in more detail with reference to FIG. 5.

Specifically, at step 510 a client learning module can identify IPv6 addresses for the plurality of Wi-Fi clients on a private network. At step 520, a traffic classification module inspects traffic and attempt to match site prefix of IPv6 addresses to an assigned organizational specific address. Responsive to matching the site prefix, classifying corresponding traffic as intended, and responsive to not matching the site prefix, classifying corresponding traffic as unintended. At step 530, calculating initial rate of packet occurrence. At step 540, predicting load [e.g., processor, network load, memory, network processes] caused by intended traffic and predicting load caused by unintended traffic, based on an initial rate of packet occurrence. At step 550, feeding back traffic load by configuring behavior of network modules according to intended traffic load and unintended traffic load; and Referring again to FIG. 4, at step 430, processing corresponding traffic at the network modules based on traffic classification from the outcome of the AI-neuron.

III. Generic Computing Environment (FIG. 6)

Figure 6:
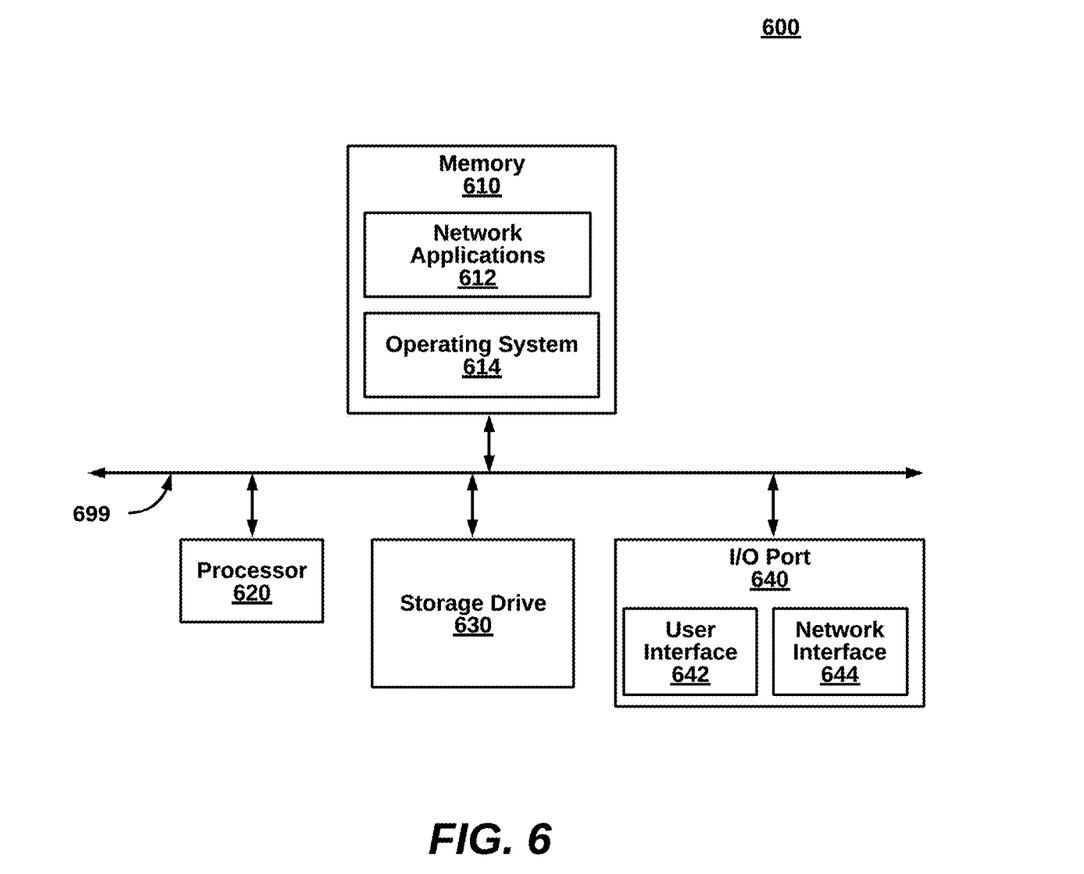
FIG. 6 is a high-level block diagram illustrating a computing device to implement the access point in the system, according to an embodiment.

FIG. 6 is a block diagram illustrating a computing device 600 capable of implementing components of the system, according to an embodiment. The computing device 600, of the present embodiment, includes a memory 610, a processor 620, a storage drive 630, and an I/O port 640. Each of the components is coupled for electronic communication via a bus 699. Communication can be digital and/or analog and use any suitable protocol. The computing device 600 can be any of components of the system 100 (e.g., the access point 110 or clients 120A-E), other networking devices (e.g., an access point, a firewall device, a gateway, a router, or a wireless station), or a disconnected device.

Network applications 612 can be network browsers, daemons communicating with other network devices, network protocol software, and the like. An operating system 614 within the computing device 600 executes software, processes. Standard components of the real OS environment 614 include an API module, a process list, a hardware information module, a firmware information module, and a file system. The operating system 614 can be FORTIOS, one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWI-FI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. An access point coupled to a plurality of Wi-Fi clients on a private network and coupled to a data communication network, to intelligently filter unwanted IPv6 traffic from Wi-Fi clients, the access point comprising:
   a processor;
   a network communication interface, communicatively coupled to the processor and to the data communication network; and
   a memory, communicatively coupled to the processor and storing source code for:
      a client learning module to learn IPv6 addresses for the plurality of Wi-Fi clients on a private network;
      a traffic classification module to attempt to match site prefix of IPv6 addresses to an assigned organizational specific address, responsive to matching the site prefix, classifying corresponding traffic as intended, and responsive to not matching the site prefix, classifying corresponding traffic as unintended; and
      a load prediction module to calculate initial rate of packet occurrence and predict load caused by intended traffic and predicting load caused by unintended traffic, based on an initial rate of packet occurrence,
      wherein the load prediction module feeds back the predicted traffic loads by configuring behavior of network modules according to the predictions of intended traffic load and unintended traffic load,
   wherein the processor processes corresponding traffic at the network modules based on traffic classification from the outcome of the AI-neuron.

2. The access point of claim 1, wherein responsive to the site prefix, determining an outcome for the corresponding traffic.

3. The access point of claim 1, wherein intended traffic is forwarded and unintended traffic is dropped.

4. The access point of claim 1, further comprising deauthenticating a Wi-Fi client sourcing unintended traffic.

5. The access point of claim 1, wherein site prefixes of IPv6 packets are matched at bits 33 to 48.

6. The access point of claim 1, wherein the predicted load is determined using multi linear regression for supervised learning.

7. The access point of claim 1, wherein the predicted load concerns at least one of the processor, a network load, the memory, and network processes.

8. The access point of claim 1, wherein the traffic classification module attempt to match a regional site prefix of IPv6 addresses to an assigned region of the access point.

9. A method in access point coupled to a plurality of Wi-Fi clients on a private network and coupled to a data communication network, to intelligently filter unwanted IPv6 traffic from Wi-Fi clients, the method comprising the steps of:
   learning IPv6 addresses for the plurality of Wi-Fi clients on a private network;
   attempting to match site prefix of IPv6 addresses to an assigned organizational specific address, responsive to matching the site prefix, classifying corresponding traffic as intended, and responsive to not matching the site prefix, classifying corresponding traffic as unintended;
   calculating initial rate of packet occurrence and predict load caused by intended traffic and predicting load caused by unintended traffic, based on an initial rate of packet occurrence,
   feeding back the predicted traffic loads by configuring behavior of network modules according to the predictions of intended traffic load and unintended traffic load; and
   processing corresponding traffic at the network modules based on traffic classification from the outcome of the AI-neuron.

10. The method of claim 1, wherein responsive to the site prefix, determining an outcome for the corresponding traffic.

11. The method of claim 1, wherein intended traffic is forwarded and unintended traffic is dropped.

12. The method of claim 1, further comprising deauthenticating a Wi-Fi client sourcing unintended traffic.

13. The method of claim 1, wherein site prefixes of IPv6 packets are matched at bits 33 to 48.

14. The method of claim 1, wherein the predicted load is determined using multi linear regression for supervised learning.

15. The method of claim 1, wherein the predicted load concerns at least one of the processor, a network load, the memory, and network processes.

16. The method of claim 1, wherein the traffic classification module attempt to match a regional site prefix of IPv6 addresses to an assigned region of the access point.

17. A non-transitory computer-readable media in access point coupled to a plurality of Wi-Fi clients on a private network and coupled to a data communication network, implemented at least partially in hardware for, when executed by a processor, to intelligently filter unwanted IPv6 traffic from Wi-Fi clients, the method comprising the steps of:
   learning IPv6 addresses for the plurality of Wi-Fi clients on a private network;
   attempting to match site prefix of IPv6 addresses to an assigned organizational specific address, responsive to matching the site prefix, classifying corresponding traffic as intended, and responsive to not matching the site prefix, classifying corresponding traffic as unintended; and
   calculating initial rate of packet occurrence and predict load caused by intended traffic and predicting load caused by unintended traffic, based on an initial rate of packet occurrence,
   feeding back the predicted traffic loads by configuring behavior of network modules according to the predictions of intended traffic load and unintended traffic load;
   processing corresponding traffic at the network modules based on traffic classification from the outcome of the AI-neuron.

18. The method of claim 1, wherein responsive to the site prefix, determining an outcome for the corresponding traffic.

19. The method of claim 1, wherein intended traffic is forwarded and unintended traffic is dropped.

20. The method of claim 1, further comprising deauthenticating a Wi-Fi client sourcing unintended traffic.

* * * * *